United States Patent
Uleski

(10) Patent No.: US 6,281,453 B1
(45) Date of Patent: Aug. 28, 2001

(54) CARRIER AND KNOB STOP ENCODER ASSEMBLY

(75) Inventor: Michael A. Uleski, Roseville, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/519,396

(22) Filed: Mar. 3, 2000

(51) Int. Cl.[7] .............................. H01H 19/14; H01H 9/00
(52) U.S. Cl. .............................. 200/4; 200/5 R; 200/565; 200/336
(58) Field of Search .............................. 200/4, 11 R, 545, 200/564, 5 R, 18, 565, 567, 329, 293, 296, 336

(56) References Cited

U.S. PATENT DOCUMENTS

| | | | |
|---|---|---|---|
| 2,745,689 | * 5/1956 | Balint et al. | 287/53 |
| 3,635,512 | 1/1972 | Hansen | 293/353 |
| 4,164,633 | * 8/1979 | Sheridan et al. | 200/4 |
| 4,737,608 | * 4/1988 | Jones | 200/155 R |
| 4,866,219 | * 9/1989 | Riding et al. | 200/4 |
| 4,885,434 | 12/1989 | Vultaggio et al. | 200/4 |
| 5,546,067 | * 8/1996 | Schmidt et al. | 338/172 |
| 5,954,192 | * 9/1999 | Iitsuka | 200/336 |

OTHER PUBLICATIONS

Component Technical Specification "Switch AssemblyCorporated Headlamp Switch" Spec. No. 12450331, p. 34 dated Sep. 30, 1997.

Specifications and drawing for Alps Electric Company, Ltd., Model No. EC168G4244 (with Detent), Sep. 1, 1999.

* cited by examiner

Primary Examiner—Michael Friedhofer
(74) Attorney, Agent, or Firm—Brooks & Kushman P.C

(57) ABSTRACT

A selector switch using a digital encoder for controlling multiple functions of a vehicle accessory. A rotary switch having a body portion and a shaft is provided. The shaft has a rotary axis and terminates at a distal end that is received by a knob. A carrier is provided on the shaft in conjunction with the knob and has at least one spring and ball for engaging a detent formed in a face plate of the selector switch assembly. The face plate has a plurality of circumferentially arranged detents that are engaged by the ball to provide intermediate position stops for the knob. The face plate and knob cooperate to provide end stops for limiting arcuate movement of the knob. Redundant detents and end stops may be provided for durability and improved operation. The selector switch may be used to control headlights and parking lights for a vehicle and may provide either instantaneous control or delayed turn-off of headlights, depending upon the digital output of the encoder at a preselected detent location.

9 Claims, 3 Drawing Sheets

CARRIER AND KNOB STOP ENCODER ASSEMBLY

TECHNICAL FIELD

The present invention relates to selector switches for vehicle accessories such as headlights and the like.

BACKGROUND ART

Automotive vehicles include a wide variety of accessories and systems such as headlights, windshield wipers and the like that are controlled by selector switches mounted on the dash or steering column. It is important that selector switches are easy to operate and that they provide the proper "feel". Selector switches must also be durable and robust to provide users with the feeling of quality.

Vehicle manufacturers have set stringent design standards for selector switches. Vehicle manufacturers have also imposed design requirements to assure that customer expectations as to the operation of manual controls are fulfilled.

For example, vehicle light controls must be easy to operate but sufficient turning torque must be required for operation to provide a quality feel. For selector switches that are adjusted by rotating a knob, design requirements are set by vehicle manufacturers to assure that the knob cannot be turned past predetermined arcuate limits. End stops that limit knob movement must be positive and sufficiently durable to resist breakage.

Selector switches for automotive applications have evolved into relatively large complicated structures to meet vehicle manufacturer standards. Different types of selector switches have been developed including switches having rotary switch contacts and switches having sliding switch contacts. One example of a rotary switch is disclosed in U.S. Pat. No. 4,885,434 that discloses a composite push-pull headlight and rotary switch. Typically, a dash-mounted headlight control switch includes multiple functions and may be 3–4 inches in depth. These types of control switches are provided with thick copper contacts that must have the capacity to carry operational circuit current loads. This type of switch is relatively expensive to manufacture and lacks design flexibility.

In an attempt to reduce vehicle cost and weight, vehicle manufacturers have recently begun to utilize multiplexed digital controls for vehicle accessories. In multiplex controls, only digital control level current carrying wiring harnesses are required to connect switches to control circuits. Control circuits are interfaced with operational circuits by relays, SCR or MOSFET interfaces. This can reduce the cost of wiring harnesses by reducing the number and size of wires in wiring harnesses. Control switches can be reduced in size and switch contacts can be designed with lower current-carrying capacity when only control circuit level currents must be carried by the selector switches. Since less current is being controlled by the selector switches, the switches may be designed with reduced heat resistance properties.

Encoders have been developed as standardized electronic components that are used to provide a digital indication of the rotational position of a shaft. Usually, encoders are designed for full rotation and do not include end stops that would prevent rotation in a full circle. Encoders normally are designed to provide only low levels of rotational torque resistance. Encoders also generally provide a large number of digital outputs. For example, a four-bit encoder would generally have sixteen potential outputs, or stops. Few if any automotive systems require as many as sixteen outputs to be controlled by a single switch. The additional potential outputs are unacceptable for automotive accessory controls because the provision of additional no-function stops for a selector switch would be confusing to a automobile operator.

These and other problems in the prior art are addressed by the present invention as summarized below.

DISCLOSURE OF INVENTION

According to the present invention, a selector switch assembly for control of multiple functions of a vehicle accessory, or accessories, is provided. The selector switch includes a rotary switch having a body portion and a shaft having a rotary axis. The shaft extends from the body portion and terminates at a distal end thereof. A knob has an internal receptacle for receiving the distal end of the shaft. The knob has at least one rib that forms part of a positive stop. A carrier is provided that has an opening through which the shaft is received. The carrier is assembled to the shaft between the body of the rotary switch and the knob. The carrier has at least one spring and at least one ball contained in a cavity formed in the carrier. The spring biases the ball radially outwardly. A face plate is provided for enclosing the rotary switch. The face plate has at least two end stops formed at circumferentially spaced locations on the face plate. The two end stops are positioned to be engaged by the rib as the knob is rotated to provide positive stops for limiting rotation of the knob in both the clockwise and counterclockwise directions. The face plate has a set of circumferentially arranged detents that are engaged by the ball retained in the carrier to provide intermediate position stops for the knob.

According to one aspect of the present invention, the rotary switch may be a digital encoder that produces a digital signal representative of the position of the shaft as signified by the generation of one of a plurality of digital codes. The digital encoder is connected to a circuit that is used to control at least one vehicle accessory based upon the digital code provided as the digital signal produced by the digital encoder. The rotary switch or digital encoder is preferably secured to a circuit board and has electrical contacts that are electrically connected to the circuit board.

In accordance with the invention, a shaft having a D-shaped cross-section is provided. The knob is assembled to the D-shaped shaft by a spring clip that is affixed to the knob and has a portion that encircles and engages the shaft. The opening in the carrier is preferably D-shaped and the shaft has a corresponding D-shaped cross-section that aligns the knob, carrier and shaft.

In one form of the invention, the cavity formed in the carrier has a longitudinal axis that extends radially outwardly. The spring is aligned with the longitudinal axis of the cavity to bias the ball into engagement with the detents formed on the face plate. In a preferred form of the invention, two springs and two balls are provided in the carrier at diametrically opposite locations to provide a knob with balanced and smooth operation. Two sets of detents are provided at diametrically spaced locations. The balls in the carrier are biased into contact with the detents formed on the face plate.

According to another aspect of the invention, the face plate defines a cavity in which a circuit board may be secured. The circuit board is preferably contained in the cavity by a backing board that allows the selector switch assembly to be modular in design.

In one form of the invention, the selector switch is used to control a set of headlights, a set of parking lights, and a dome light of a vehicle. The headlights may be turned on at a first position without delay, turned on with a first delay in a second position, and turned on with a second delay in a third position. The parking lights may be turned on separately in a fourth position and are also turned on in each of the first, second and third positions with the headlights. A dome light may be independently controlled by providing a momentary push switch as part of the rotary switch.

According to the present invention, a multi-function automotive accessory switch can be provided utilizing a simple and inexpensive digital encoder. The knob and carrier including spring-biased detents can provide a selector switch with the appropriate level of rotational torque resistance even though the encoder itself provides only minimal torque resistance. The selector switch also provides robust and durable end stops that limit the arcuate movement of the knob to the desired range of movement. In this way, a compact, inexpensive and reliable selector switch can be provided in modular form that meets vehicle manufacturer's turning torque and durability requirements.

BEST MODE FOR CARRYING OUT THE INVENTION

Figure 1:
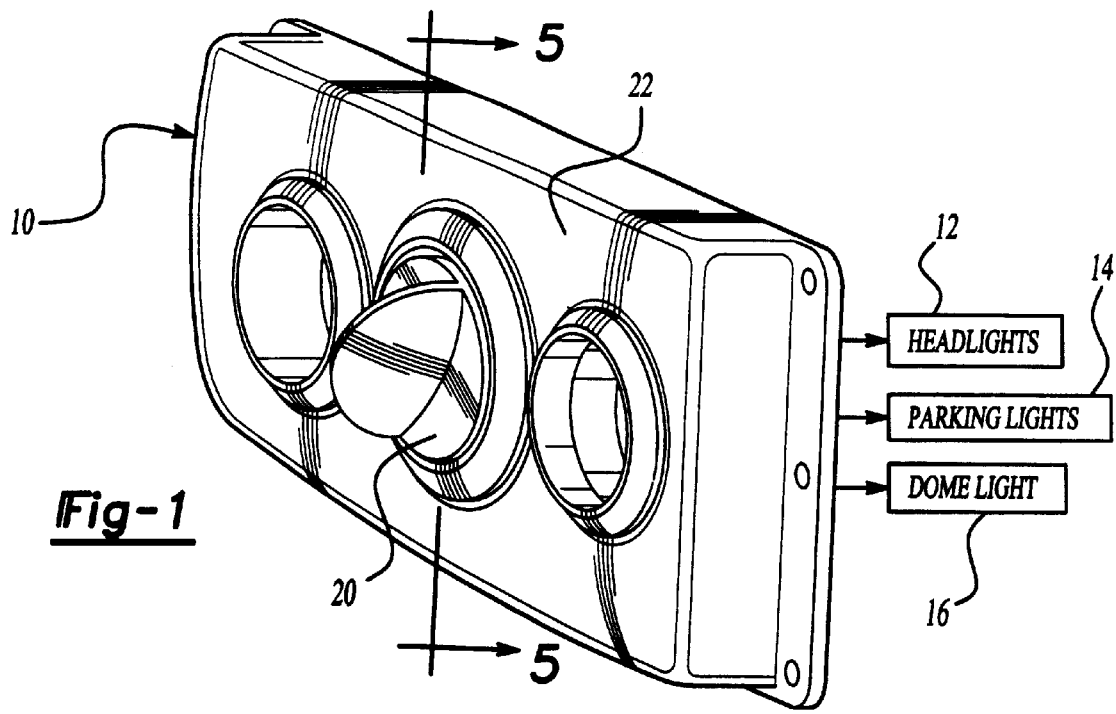
FIG. 1 is a front perspective view of a selector switch assembly for a multiple function control of a vehicle accessory made in accordance with the present invention.
Figure 2:
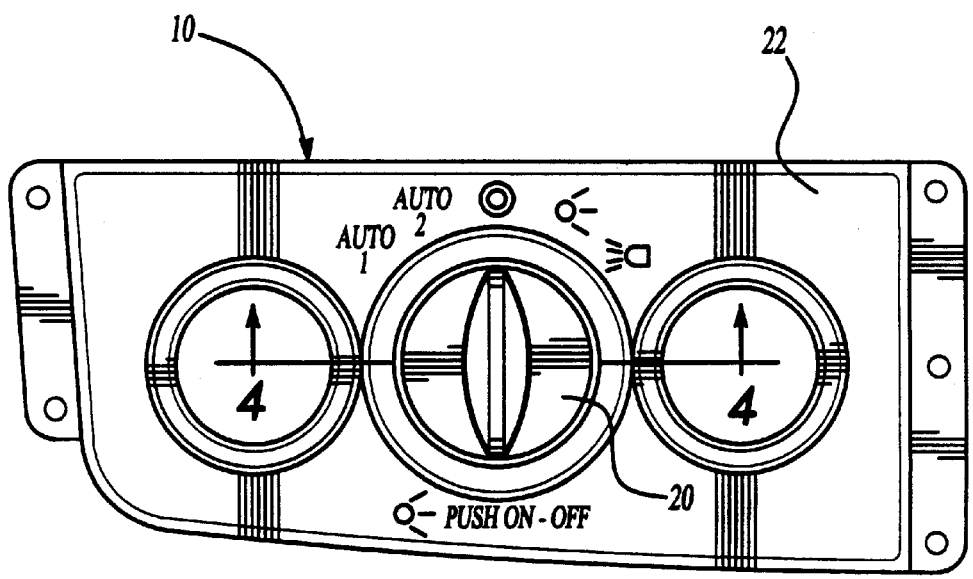
FIG. 2 is a front elevation view of the selector switch assembly of the present invention.
Figure 3:
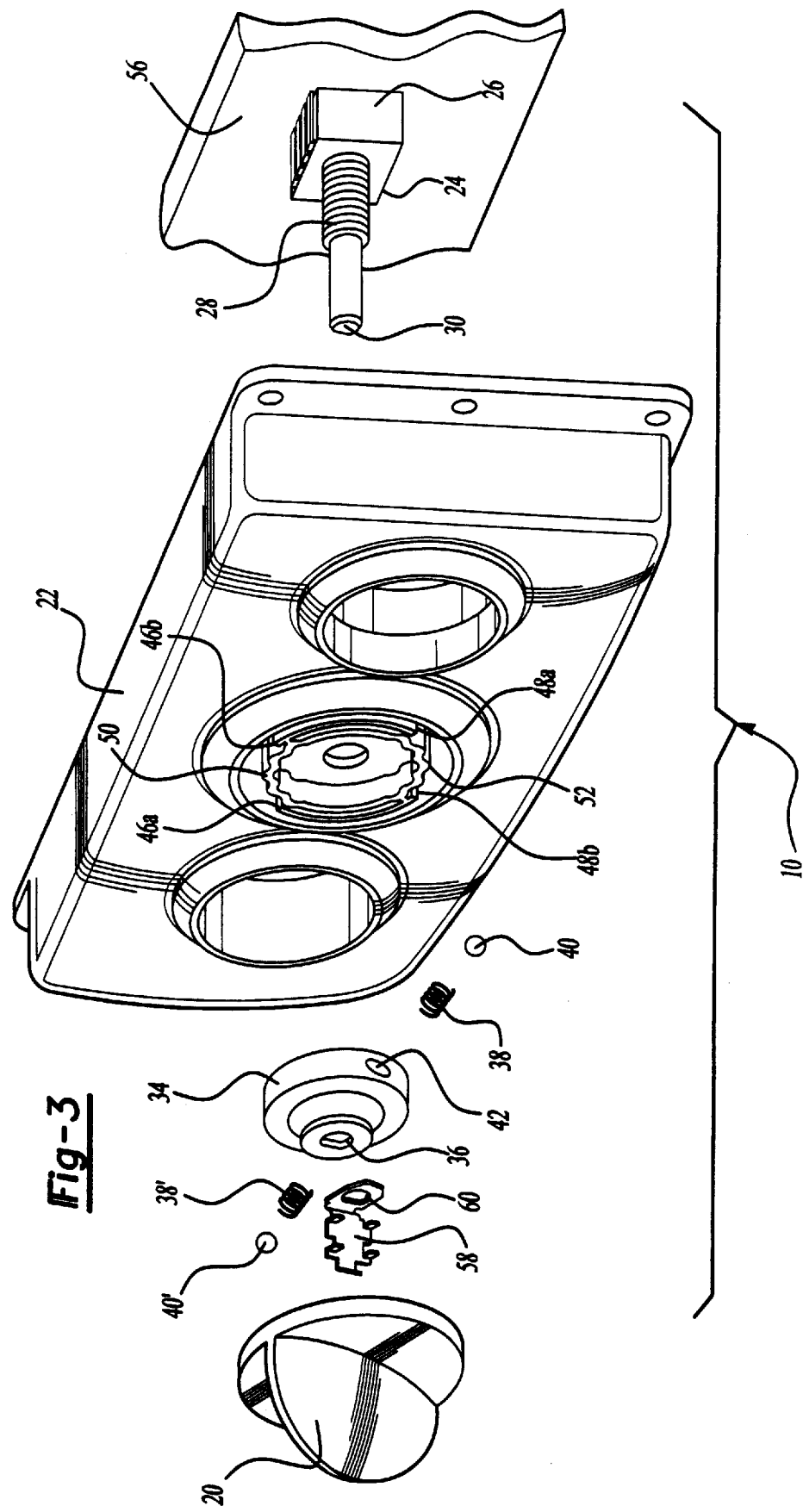
FIG. 3 is an exploded perspective view of a selector switch assembly of the present invention.

Referring now to FIGS. 1–3, the structure and operation of the multifunction selector switch will be described with reference to a preferred embodiment that is believed to be the best mode for carrying out the invention. The selector switch assembly 10 is used to control headlights 12, parking lights 14, and a dome light 16, or other interior lights. It should be understood that the multi-function selector switch of the present invention could be used to control other lights or accessories of the vehicle as will be readily understood by one of ordinary skill in the art. The selector switch assembly 10 includes a knob 20 that is rotatable relative to a face plate 22.

Referring particularly to FIG. 2, the selector switch assembly 10 is shown with positions labeled for automatic headlight operation with delayed turn off with "Auto 1" having a first incremental period of time delay and "Auto 2" having a second incremental period of time delay. Positions are also shown for turning the headlights and parking lights off, turning the parking lights on alone, and turning the headlights on manually. A designation is also provided for instructing on the operation of the dome light by pushing the knob 20 that is adapted to function as a momentary on/off switch.

Referring to FIG. 3, the selector switch assembly 10 is shown in exploded perspective form including the knob 20 and face plate 22 as previously described. A rotary switch 24, or encoder, includes a body 26 and a shaft 28. The shaft 28 extends from the body 26 and terminates at a distal end 30. The knob 20 is secured over the distal end 30 of the shaft 28. The shaft 28 is rotatable about its longitudinal axis that is also its rotational axis. A carrier 34 has a D-shaped opening 36 through which the shaft 28 extends. The carrier carries springs 38,38' and balls 40,40' in cavities 42,42'. The cavities are elongated cavities having a longitudinal axis. The springs 38,38' and balls 40,40' are contained within the cavities 42,42' in such a way that the springs 38,38' urge the balls 40,40' radially outwardly. The face plate 22 provides end stops 46a,46b. In a preferred embodiment, a second set of end stops 48a,48b are provided to limit the rotational movement of the knob 20.

Detents 50 are molded as part of the face plate 22. The detents 50 define an axially extending recess in which the balls 40,40' may be received to lock the knob 20 into one of the intermediate stop positions. The springs 38,38' are specified to exert the appropriate amount of pressure through the balls 40,40' against the detents 50 and a second set of detents 52. The amount of force required to rotate the knob 20 can be adjusted or modified by changing the force applied by the springs 38,38'.

The encoder 24 is secured to a circuit board 56 and is preferably electrically connected to the circuit board by suitable contacts as is well known in the art. Face plate 22 defines a cavity for enclosing the rotary switch 24 and in which the circuit board 56 is secured. The circuit board is contained in the cavity by a backing board 57.

Figure 4:
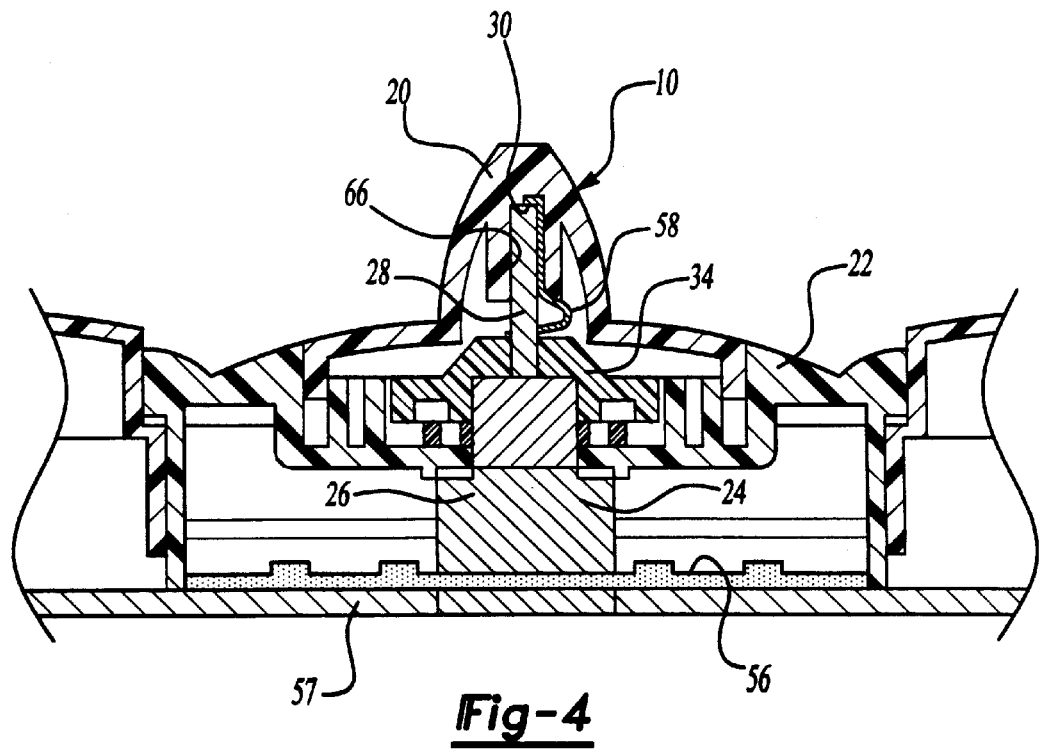
FIG. 4 is a cross-sectional view taken along the line 4—4 in FIG. 2.

A spring clip 58 is secured to the knob 20 and includes an aperture 60 in a perpendicularly oriented portion of the spring clip 58. The shaft 28 of the encoder 24 is received in the aperture 60 after the shaft 28 has been assembled through the face plate 22 and carrier 34. As shown in FIG. 4, the shaft 28 and spring clip 58 are received in an integrally formed receptacle 66 in the knob 20.

Figure 5:
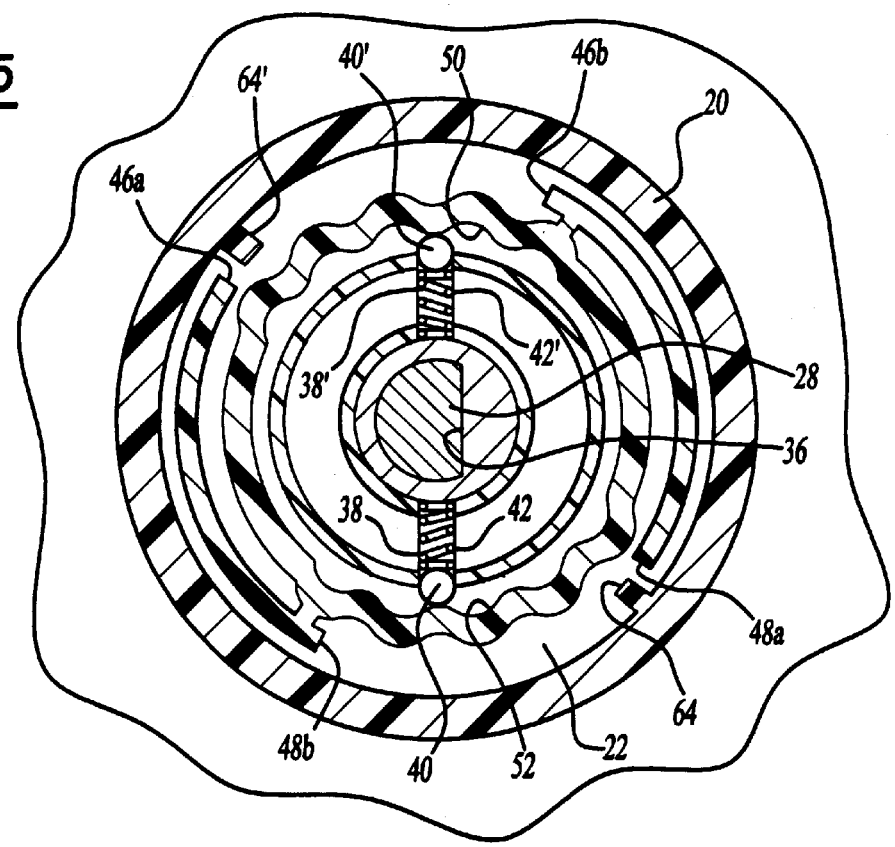
FIG. 5 is a fragmentary cross-sectional view taken at circle 5 in FIG. 1.

Referring now to FIG. 5, operation of the detents and end stops will be described in greater detail. A first set of detents 50 and a second set of detents 52 are provided at diametrically opposed locations generally aligned with detents in the encoder 24 that provide predetermined digital output signals. The springs 38,38' urge balls 40,40' outwardly to engage in the detents 50,52. As shown in FIG. 5, the selector switch is between detent positions as would occur when the knob is being turned from one position to another. The D-shaped shaft 28 and D-shaped opening 36 in the carrier keep the carrier 34, shaft 28, and knob 20 in alignment. In the embodiment shown in FIG. 5, five detent positions are provided by each of the sets of detents 50,52 that correspond with the five different radial positions identified in FIG. 2.

Ribs 64,64' limit the rotation of the knob 20 to the arcuate region defined between end stops 46a,46b and the second set of end stops 48a,48b. Rotation of the knob 20 past end stops 46a,48a and 46b,48b is prevented because rotational movement is stopped when the ribs 64,64' contact the end stops 46a,48a and 46b,48b.

The illustrated embodiment includes redundant sets of detents 50,52 and redundant springs 38,38', balls 40,40', and cavities 42,42'that are adapted to engage the two sets of detents 50,52. Likewise, first and second sets of end stops 46a,46b and 48a,48b are provided to stop movement of the ribs 64,64' in the counterclockwise and clockwise directions. It will be readily understood that a single set of ribs and end stops and a single set of springs, balls, cavities and detents could be provided without departing from the spirit or scope of the present invention. Redundant end stops and detents are provided to balance the knob construction and provide increased durability and enhanced product performance.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A selector switch assembly for a multiple function control of at least one vehicle accessory comprising:

a rotary switch having a body portion and a shaft having a rotary axis and extending from the body portion, the shaft terminating at a distal end;

a knob having an internal receptacle for receiving the distal end of the shaft, the knob having at least one rib;

a carrier having an opening for receiving the shaft that passes through the carrier, the carrier being assembled to the shaft between the body portion of the rotary switch and the knob, the carrier having at least one spring and at least one ball contained in a cavity formed in the carrier, wherein the spring biases the ball urging the ball to be extended radially outwardly;

a face plate defining a cavity for enclosing the rotary switch and in which a circuit board is secured, the circuit board being contained in the cavity by a backing board, the face plate having at least two end stops formed at circumferentially spaced locations on the face plate that are engaged by the rib to provide positive stops for limiting rotation of the knob in both the clockwise and counterclockwise directions, the face plate having a set of circumferentially arranged detents that are engaged by the ball to provide intermediate position stops for the knob.

2. The selector switch of claim 1 wherein the rotary switch is a digital encoder that produces a digital signal representative of a position of the shaft that is represented by a plurality of digital codes, the digital encoder being connected to a circuit that controls at least one vehicle accessory based upon the digital code of a digital signal produced by the digital encoder.

3. The selector switch of claim 1 wherein the rotary switch is secured to a circuit board, the rotary switch having electrical contacts that are electrically connected to the circuit board.

4. The selector switch of claim 1 wherein the shaft has a D-shaped cross-section and the knob is assembled to the shaft by a spring clip that is affixed to the knob and has a portion that encircles and engages the shaft.

5. The selector switch of claim 1 wherein the opening in the carrier is D-shaped and the shaft has a D-shaped cross-section that aligns the knob, carrier and shaft, the cavity formed in the carrier having a longitudinal axis that extends radially outwardly, the spring being aligned with the longitudinal axis of the cavity and biasing the ball into engagement with the detents formed on the face plate.

6. The selector switch of claim 1 wherein two springs and two balls are provided in the carrier at diametrically opposite locations, and wherein two sets of the detents are provided at diametrically spaced locations and in which the balls in the carrier are biased into contact with the detents simultaneously at diametrically opposed locations.

7. The selector switch of claim 1 wherein the switch is used to control a set of headlights, a set of parking lights and the dome light of a vehicle.

8. The selector switch of claim 7 wherein the headlights may be turned on at a first position without delay, the headlights may be turned on with a first delay period in a second position, the headlights may be turned on with a second delay period in a third position, the parking lights may be turned on in a fourth position and are turned on in each of the first, second and third positions.

9. A selector switch assembly for a multiple function control of at least one vehicle accessory comprising:

a rotary switch having a body portion and a shaft having a rotary axis and extending from the body portion, the shaft terminating at a distal end;

a knob having an internal receptacle for receiving the distal end of the shaft, the knob having at least one rib;

a carrier having an opening for receiving the shaft that passes through the carrier, the carrier being assembled to the shaft between the body portion of the rotary switch and the knob, the carrier having at least one spring and at least one ball contained in a cavity formed in the carrier, wherein the spring biases the ball urging the ball to be extended radially outwardly;

a spring clip secured to the knob connects the knob to the shaft and exerts a biasing force on the carrier against the body of the rotary switch; and a face plate defining a cavity for enclosing the rotary switch and in which a circuit board is secured, the circuit board being contained in the cavity by a backing board, the face plate having at least two end stops formed at circumferentially spaced locations on the face plate that are engaged by the rib to provide positive stops for limiting rotation of the knob in both the clockwise and counterclockwise directions, the face plate having a set of circumferentially arranged detents that are engaged by the ball to provide intermediate position stops for the knob.

* * * * *